US012738100B2

(12) United States Patent
Kolla et al.

(10) Patent No.: US 12,738,100 B2
(45) Date of Patent: Sep. 15, 2026

(54) METHOD AND SYSTEM FOR PERFORMING VIDEO-BASED AUTOMATIC IDENTITY VERIFICATION

(71) Applicant: HyperVerge Technologies Private Limited, Bengaluru (IN)

(72) Inventors: Manideep Kolla, Nellore (IN); Shreyansh Das, Noida (IN); Chinmaya Hegde, Mysuru (IN); Hariprasad P S, West Mambalam (IN); Prateek, Kullu (IN); Saivenkatesh A, Bengaluru (IN); Vignesh Krishnakumar, Chennai (IN)

(73) Assignee: HYPERVERGE TECHNOLOGIES PRIVATE LIMITED, Bengaluru (IN)

( * ) Notice: Subject to any disclaimer, the term of this patent is extended or adjusted under 35 U.S.C. 154(b) by 239 days.

(21) Appl. No.: 18/635,225

(22) Filed: Apr. 15, 2024

(65) Prior Publication Data

US 2024/0346850 A1 Oct. 17, 2024

(30) Foreign Application Priority Data

Apr. 14, 2023 (IN) ............................ 202311027709

(51) Int. Cl.

| | |
|---|---|
| ***G06V 40/40*** | (2022.01) |
| ***G06V 10/82*** | (2022.01) |
| ***G06V 30/42*** | (2022.01) |
| ***G06V 40/16*** | (2022.01) |

(Continued)

(52) U.S. Cl.

CPC .............. *G06V 40/45* (2022.01); *G06V 10/82* (2022.01); *G06V 30/42* (2022.01); *G06V 40/161* (2022.01); *G06V 40/172* (2022.01); *G10L 15/02* (2013.01); *G10L 15/25* (2013.01); *G10L 2015/025* (2013.01)

(58) Field of Classification Search

CPC .... G06V 40/45; G06V 40/172; G06V 40/161; G06V 40/171; G06V 10/82; G06V 30/42; G10L 15/02; G10L 15/25; G10L 2015/025; G10L 17/10

See application file for complete search history.

(56) References Cited

U.S. PATENT DOCUMENTS 10,452,897 B1 * 10/2019 Benkreira ............ G06V 40/172
11,908,478 B2 * 2/2024 Maizels ................. G06V 10/60

(Continued)

*Primary Examiner* — Stephen G Sherman

(74) *Attorney, Agent, or Firm* — Ladas & Parry, LLP

(57) ABSTRACT

The present invention relates to a method and system for performing video-based automatic identity verification. The method at least comprises: generating prompt(s); capturing, a video that comprises the first user speaking the prompt(s); capturing an image of an identification document comprising an image of a second user; detecting a correctness of a speech in the video based on a deepfake detection score, a visual cues match, and a transcription match; detecting in one or more frames of the video, the first human object based on the correctness of the speech and in the image of the identification document, the second human object; generating a first similarity score, and a second similarity score, based on the detection of the first human object and second human object; and performing the identity verification of the first user, based on the first similarity score, and the second similarity score.

22 Claims, 3 Drawing Sheets

(51) Int. Cl.
*G10L 15/02* (2006.01)
*G10L 15/25* (2013.01)

(56) References Cited

U.S. PATENT DOCUMENTS

| | | | | |
|---|---|---|---|---|
| 2003/0179933 | A1* | 9/2003 | Kato | G10L 17/20<br>382/190 |
| 2021/0110831 | A1* | 4/2021 | Shillingford | G06N 3/044 |
| 2021/0141888 | A1* | 5/2021 | Hires | H04L 9/3231 |
| 2021/0173916 | A1* | 6/2021 | Ortiz | H04L 9/3231 |
| 2022/0121868 | A1* | 4/2022 | Chen | G06V 40/40 |

* cited by examiner

METHOD AND SYSTEM FOR PERFORMING VIDEO-BASED AUTOMATIC IDENTITY VERIFICATION

CROSS-REFERENCE TO RELATED APPLICATION

The present disclosure claims the priority to Indian Patent Application No. 202311027709 filed on Apr. 14, 2023, the disclosure of which is incorporated herein by reference in its entirety.

FIELD OF THE INVENTION

The present disclosure generally relates to methods and systems for authenticating identity of person(s). More particularly, the present disclosure relates to methods and systems for performing video-based automatic identity verification.

BACKGROUND OF THE DISCLOSURE

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

With the increased reliance and dependency on the internet, nowadays, various tasks are performed digitally, for example, opening a bank account, submission of application of other transactions, etc. which earlier required physical presence of people for authenticity concerns. For this purpose, video authentication of persons is performed so as to verify and confirm the identity of a person in question. Thus, there is also a possibility of identity fraud, and resultantly there is an increase in identity fraud during video-based identity authentication. Common forms of identification are now simpler to manipulate digitally as more people move into the electronic age. For instance, there are an increasing number of instances where identity fraud has been done by misrepresenting human figures in videos, for example, by replacing human object with robots during video identity authentication, by replacing a human object not with a robot but with some other human object for authentication.

Thus, video authentication is required to implement advanced measures that are able to mitigate various digital frauds during an identity verification. Several solutions pertaining to video authentication have been developed over a period of time, however these solutions suffer from various limitations and drawbacks. For instance, the currently known solutions of video authentication provide a generic face match solutions and fail to efficiently identify live human faces, for example, they fail to identify difference between live human objects and recorded video for authentication purposes, which is crucial for identity verification.

It is also critical to analyze with high accuracy, if the human subject is live and herself/himself performing the identity verification. However, the existing solutions do not perform at least a deepfake detection on the captured video, and at least for this reason among other reasons, their identity verification is not reliable. For an efficient identity verification, the videos of human objects need to be applied to deepfake detection along with other means of identity authentication such as including but not limited to lip reading, liveness detection, speech-to-text matching, face detection for the recorded video, face detection for the identity cards, face verification, etc.

Liveness check is another critical aspect for real-world identity verification to at least ensure that the person whose video is captured is indeed present in person, and/or to ensure the video is captured in real time and the person is indeed physically present while capturing the video during identity authentication. For proper real-world identity verification, the verification of the liveness of "both the image of the person in each frame of the video captured, and the image of the identity (ID) card of the person" is necessary, for e.g., apart from impersonation in video of person(s), people can impersonate/defraud by using digitally edited ID cards or stealing digital copies of other people's ID cards and swapping the existing face in said ID cards with theirs. However, for identity verification the currently known solutions fail to perform liveness checks for image(s) of ID card(s). In the absence of ID liveness check, the existing solutions end up comparing video of human objects and non-live ID card photos. Moreover, the non-live ID cards are known to have serious artifacts like moire effect which affects feature extraction and affect overall face recognition accuracy. Therefore, for identity verification (say for face verification with identification documents), it is necessary to provide an efficient solution for an efficient authentication of a video of at least one of a human object and an identification document.

Although the existing technologies have provided various solutions for identity verification via video authentication, these currently known solutions have many limitations and there is a need for improvement in this area of technology. Therefore, there is a need in the art to provide a solution to overcome the problems related to the currently known solutions and to provide a solution to efficiently verify a human object in a video, that is, to perform video-based automatic identity verification.

SUMMARY

This section is provided to introduce certain aspects of the present disclosure in a simplified form that are further described below in the detailed description. This summary is not intended to identify the key features or the scope of the claimed subject matter.

An aspect of the present disclosure may relate to a method for performing video-based automatic identity verification of a first user, the method comprises generating, by a prompt generation unit, one or more prompts. The method comprises capturing, via a capturing unit, a video. The video comprises the first user speaking the one or more prompts wherein face of the first user is a first human object. The method comprises capturing, via the capturing unit, an image of an identification document comprising an image of a second user wherein face of the second user is a second human object. The method comprises generating, by a deepfake detection unit, a deepfake detection score of the video based on one or more deepfake-techniques. The method comprises detecting, by a lip-reading unit, a correctness of a speech in the video based on the deepfake detection score, a visual cues match, and a transcription match. The speech is associated with the first user speaking the one or more prompts. The visual cues match comprises one of a valid lip contour movement match and an invalid lip contour movement match. The method comprises detecting, by a face detection unit, in one or more frames of the video, the first human object based on the correctness of the speech and in the image of the identification document, the second human object. The method comprises generating, by a face verification unit, a first similarity score, and a second similarity score, based on the detection of the first human object and the second human object. The first similarity score is generated based on a similarity within a plurality of feature vectors of the first human object present in a plurality of frames of the video. The second similarity score is generated based on a similarity between the plurality of feature vectors of the first human object present in the plurality of frames of the video and a feature vector of the second human object present in the image of the identification document. The method comprises automatically performing, by the face verification unit, the identity verification of the first user, based on the first similarity score, and the second similarity score.

Another aspect of the present disclosure may relate to a system for performing video-based automatic identity verification of a first user. The system comprises a prompt generation unit configured to generate one or more prompts. The system comprises a capturing unit configured to capture a video. The video comprises the first user speaking the one or more prompts wherein face of the first user is a first human object. The capturing unit is further configured to capture an image of an identification document comprising an image of a second user wherein face of the second user is a second human object. The system comprises a deepfake detection unit configured to generate a deepfake detection score of the video based on one or more deepfake-techniques. The system comprises a lip-reading unit configured to detect a correctness of a speech in the video, based on the deepfake detection score, a visual cues match, and a transcription match. The speech is associated with the first user speaking the one or more prompts. The visual cues match comprises one of a valid lip contour movement match and an invalid lip contour movement match. The system comprises a face detection unit that is configured to detect in one or more frames of the video, the first human object based on the correctness of the speech and in the image of the identification document, the second human object. The system comprises a face verification unit configured to generate a first similarity score, and a second similarity score, based on the detection of the first human object and the second human object. The first similarity score is generated based on a similarity within a plurality of feature vectors of the first human object present in a plurality of frames of the video. The second similarity score is generated based on a similarity between the plurality of feature vectors of the first human object present in the plurality of frames of the video and a feature vector of the second human object present in the image of the identification document. The face verification unit is further configured to automatically perform the identity verification of the first user, based on the first similarity score, and the second similarity score.

Objects of the Disclosure

This section is provided to introduce certain objects and aspects of the present invention in a simplified form that are further described below in the description.

In order to overcome at least a few problems associated with the known solutions as provided in the previous section, an object of the present invention is to substantially reduce the limitations and drawbacks of the prior arts as described hereinabove.

Another object of the invention is to provide a system and a method for performing video-based automatic identity verification, involving a deepfake check on the input video.

Yet another object of the invention is to provide a system and a method for performing video-based automatic identity verification, that is able to indicate a suspicious entry or an impersonation attempt in case of deepfake check failure.

Yet another object of the invention is to provide a system and a method for performing video-based automatic identity verification, that implements an identity verification module along with a liveness detection system.

Yet another object of the invention is to provide a system and a method for performing video-based automatic identity verification, that implements a lip reading module which verifies whether the lip movements of the subject are consistent with a prompt the user is supposed to speak.

Yet another object of the invention is to provide a system and a method for performing video-based automatic identity verification, that implements a face verification system that is able to verify the identity of the subject.

Yet another object of the invention is to provide a system and a method for performing video-based automatic identity verification, that is able to match faces within different frames of the video.

BRIEF DESCRIPTION OF DRAWINGS

The accompanying drawings, which are incorporated herein, constitute a part of this disclosure. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components. Although exemplary connections between sub-components have been shown in the accompanying drawings, it will be appreciated by those skilled in the art, that other connections may also be possible, without departing from the scope of the invention. All sub-components within a component may be connected to each other, unless otherwise indicated.

Figure 1:
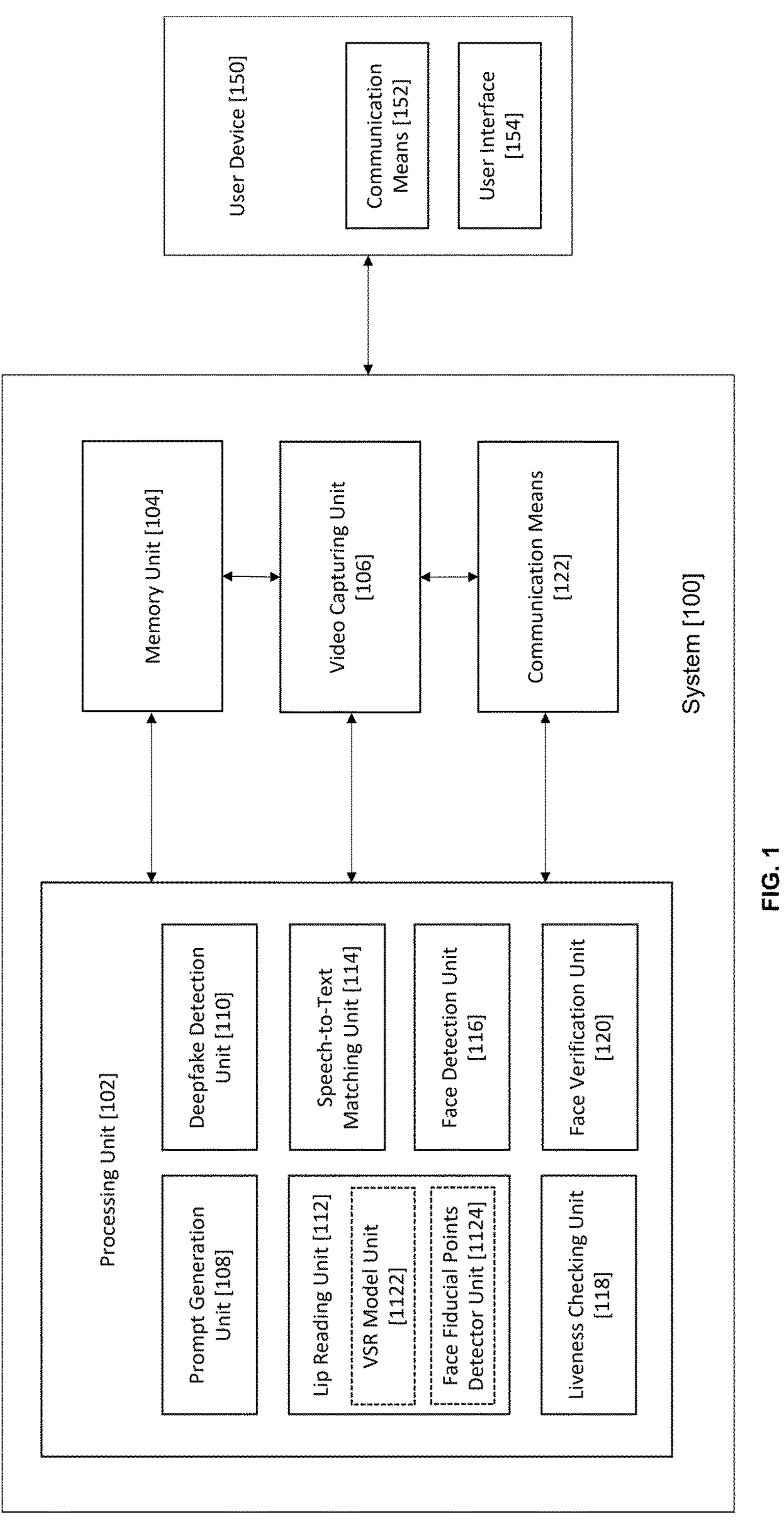
FIG. 1 illustrates an exemplary system diagram for performing video-based automatic identity verification, in accordance with exemplary embodiments of the present invention.

The foregoing shall be more apparent from a more detailed description of the invention below.

DETAILED DESCRIPTION OF THE DISCLOSURE

In the following description, for the purposes of explanation, various specific details are set forth in order to provide a thorough understanding of the embodiments of the present invention. It will be apparent, however, that embodiments of the present invention may be practiced without these specific details. Several features described hereafter can each be used independently of one another or with any combination of other features. An individual feature may not address any of the problems discussed above or might address only some of the problems discussed above. Some of the problems discussed above might not be fully addressed by any of the features described herein. Example embodiments of the present invention are described below, as illustrated in various drawings.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

It should be noted that the terms "mobile device", "user equipment", "user device", "communication device", "device" and similar terms are used interchangeably for the purpose of describing the invention. These terms are not intended to limit the scope of the invention or imply any specific functionality or limitations on the described embodiments. The use of these terms is solely for convenience and clarity of description. The invention is not limited to any particular type of device or equipment, and it should be understood that other equivalent terms or variations thereof may be used interchangeably without departing from the scope of the invention as defined herein.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, an "electronic device", or "portable electronic device", or "user device" or "communication device" or "user equipment" or "device" refers to any electrical, electronic, electromechanical and computing device. The user device is capable of receiving and/or transmitting one or more parameters, performing function/s, communicating with other user devices and transmitting data to the other user devices. The user equipment may have a processor, a display, a memory, a battery and an input-means such as a hard keypad and/or a soft keypad. The user equipment may be capable of operating on any radio access technology including but not limited to IP-enabled communication, Zig Bee, Bluetooth, Bluetooth Low Energy, Near Field Communication, Z-Wave, Wi-Fi, Wi-Fi direct, etc. For instance, the user equipment may include, but not limited to, a mobile phone, smartphone, virtual reality (VR) devices, augmented reality (AR) devices, laptop, a general-purpose computer, desktop, personal digital assistant, tablet computer, mainframe computer, or any other device as may be obvious to a person skilled in the art for implementation of the features of the present disclosure.

Further, the user device may also comprise a "processor" or "processing unit", wherein processor refers to any logic circuitry for processing instructions. The processor may be a general-purpose processor, a special purpose processor, a conventional processor, a digital signal processor, a plurality of microprocessors, one or more microprocessors in association with a DSP core, a controller, a microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor is a hardware processor.

As used herein, "storage unit" or "memory unit" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media. The storage unit stores at least the data that may be required by one or more units of the server/system/user device to perform their respective functions.

The present invention relates to methods and systems for performing video-based automatic identity verification. The methods and systems of the present invention particularly relate to authenticating a video of at least one human object (e.g., a human face) against live presence of the same human object behind the camera.

The invention firstly encompasses generating one or more prompts and displaying the same to the user. The user is required to speak the prompt for the verification process. Further, a video of the user speaking the one or more prompts is captured. The acquired video is passed through a deep fake detection system. Thereafter, the video is subject to a lip reading check where it is checked whether the user is speaking the same words that the user is expected to speak while reading the one or more prompts.

Further, the invention also encompasses speech-to-text matching where the audio is extracted from the recorded video and transcription of that audio is matched with the original prompts. Further, the invention also encompasses a face detection system for the recorded video which detects and crops the face in each frame of the video using a neural network-based rotation-invariant face detector.

The invention further encompasses processing an image of an identification document. After capturing the image of the identification document (ID), the invention proceeds to detecting an identification document and cropping an ID region of interest (ROI) from the image of the ID using a convolutional neural network-based object detector. Thereafter, the invention encompasses performing the steps of ID ROI alignment, ID liveness check, one or more ID quality checks, one or more ID tampering checks. The invention then encompasses identifying another human face in the image of the ID ROI. After identifying another human face in the image of the ID ROI, the invention encompasses using a convolutional neural network-based feature extractor to determine an ID face feature vector. In an implementation if at least one of the steps of the detection of the ID, detection of the human face in the ID, performing the ID tampering checks, performing the ID quality checks and/or performing the ID liveness checks etc. fails, the invention encompasses providing an indication to re-capture the image of the ID.

Thereafter, the present invention proceeds to determination of an image face feature vector related to the video of the at least one human object and further a match score is determined between the image face feature vector and the ID face feature vector related to the image of the ID, wherein the match score is determined based on a cosine distance between the image face feature vector and the ID card face feature vector. Based on a threshold value, the match score is further used to determine a success status, say indicating one of an authentication success, an authentication failure, and a requirement for manual review, of the image of the at least one human object and the identification document, for identity verification. The present invention therefore discloses efficient authentication systems and method for authentication of an image of at least one human object (for e.g., a human face) and an identification document based on verifying the human object (i.e., the human face) present in the image with another human object (i.e., the human face) present in the identification document.

The present disclosure is further explained in detail below with reference now to the diagrams.

Referring now to FIG. 1, an exemplary system diagram [100] for performing video-based automatic identity verification, in accordance with exemplary embodiments of the present invention is shown. The system encompasses at least one processing unit [102], at least one memory unit [104], at least one capturing unit [106], and at least one communication means [122]. Further, the processing unit [102] may comprise one or more of a prompt generation unit [108], a deepfake detection unit [110], a lip reading unit [112], a speech-to-text matching unit [114], a face detection unit [116], a liveness checking unit [118], and a face verification unit [120]. Also, the lip reading unit [112] may further comprise a visual speech recognition (VSR) model unit [1122] and a face fiducial points detector unit [1124]. All of these components/units of the system [100] are assumed to be connected to each other unless otherwise indicated below and working in conjunction to achieve the objectives of the present invention. While only a few exemplary units are shown in FIG. 1, it may be understood that the system [100] may comprise multiple such units or the system [100] may comprise any such number of the units performing said functionalities, obvious to a person skilled in the art or as required to implement the features of the present disclosure.

In an implementation, to perform the functions as disclosed in the present disclosure, the system [100] may be configured at a user device [150] or the system [100] may be in communication with the user device [150], or with a standalone device such as a kiosk or a specialized device that may be obvious to a person skilled in the art. Also, in another implementation the system [100] may be configured at a server end, wherein one or more servers at the server end may be in communication with one or more user devices to implement the features of the present disclosure.

The system [100] is configured to perform a video-based automatic identity verification of a first user with the help of the interconnection between its components/units.

In order to perform the video-based automatic identity verification, firstly, the prompt generation unit [108] is configured to generate one or more prompts. The one or more prompts are displayed to the first user via a user interface [154]. The user interface [154] may be integrated to a user device [150] using which the first user performs the video-based identity verification. Alternatively, the user interface [154] forms a part of another user device [150] on which the one or more prompts are sent via an interaction between the one or more communication means [122] of the system [100] and the one or more communication means [152] of the user device [150]. The first user is required to speak the one or more prompts that the first user reads on the user interface [154], for the video-based automatic identity verification (i.e., verification process). In an implementation, as used herein "a prompt" may be a randomly generated unique sequence of 'N' number of digits or a custom statement in a context of what the verification process is for, or a random statement generated by the system [100], or a standard statement, or any combination thereof.

After generation of the one or more prompts, the capturing unit [106] is configured to capture a video. The video comprises the first user speaking the one or more prompts wherein in the video face of the first user is a first human object. Thereafter, the capturing unit [106] is further configured to capture an image of an identification document comprising an image of a second user wherein face of the second user is a second human object. In an instance the second human object is a face of one of the first user and a second user. Moreover, in an implementation, the first user is a human object and the second user is an image of the human object present in the identification document. For example, the first user is the person who is applying of a loan and second user is the image of person present in a permanent account number (PAN) card or driver license and the system [100] aims to verify whether the image in the identification document is of the same person who is present in the video. For another example, the first user is interacting with the system [100] by speaking the one or more prompts provided by the prompt generation unit [108] such as "a randomly generated unique sequence of N digit". Further in such example, the capturing unit [106] takes an image of the identification document such as PAN card, driver's license or any other identification card having the image of the second user.

In an implementation, the capturing unit [106] may form a part of the system [100]. In another implementation, the capturing unit [106] may form part of the user device [150] and may be connected to the system [100] via the user device [150]. In an implementation, the user device [150] may be a mobile phone, a third-party kiosk, say a kiosk at a bank with a video camera, or a PC or a Mac. In an instance, for example, a user wants to perform video-based identity verification at a bank and the system [100] is present at a kiosk in the bank. In this example, there may not be a need of any separate user device, but all components may be present inside the kiosk itself. Also, the capturing unit [106] is able to extract image from a video that is captured by a video camera connected to the system [100]. Also, the video camera is able to capture image of an object as required.

Also, in an implementation, the capturing unit [106] captures the video (for example a selfie video) such that the captured video includes both the first human object and the identification document. However, the present disclosure is not limited thereto and in one other implementation, the capturing unit [106] may capture images and/or video separately for capturing the first human object and the identification document. In an implementation, a medium of information capture can be a messenger-based chatbot that gives instructions for capturing the video and the identification document along with the prompts that the first user needs to speak. Or the medium of information capture can be a mobile or web app which has the ability to capture the identification document and video and can give instructions and the one or more prompts the first user needs to speak one by one or all at a time.

Thereafter, the video and image captured by the capturing unit [106] is passed to the deepfake detection unit [110] for generating a deepfake detection score. The deepfake detection score of the video is based on one or more deepfake-techniques.

In an implementation, the deepfake detection unit [110] outputs a deepfake detection score representing a probability that the video has been or has not been tampered with. Further, based on a comparison of the deepfake detection score with a preset deepfake threshold for the deepfake detection score, the video is classified as either being a deepfake or a genuine video. Furthermore, in an implementation, if the deepfake detection score indicates that the video has been tampered, the deepfake detection unit [110] specifies a suspicious entry or an impersonation attempt or the first user is prompted by the deepfake detection unit [110] to recapture the video.

Further, in an implementation, if the deepfake detection score indicates that the video has not been tampered, a frames per second (FPS) of the video is set to 25 and the video is passed to the lip reading unit [112].

For example, the deepfake detection score for the video is within a range of 10 to 20, signifying a high likelihood of authenticity. The preset deepfake threshold is 30 to maintain a balance between one or more false positives and one or more false negatives. In this scenario, since the deepfake detection score is below the preset deepfake threshold, the video is deemed authentic, and proceeds further without intervention. However, in an instance where the deepfake detection score is above the deepfake threshold, for example, 70, the deepfake detection unit [110] prompts the first user to recapture the video, signaling a potential concern with the authenticity.

Figure 2:
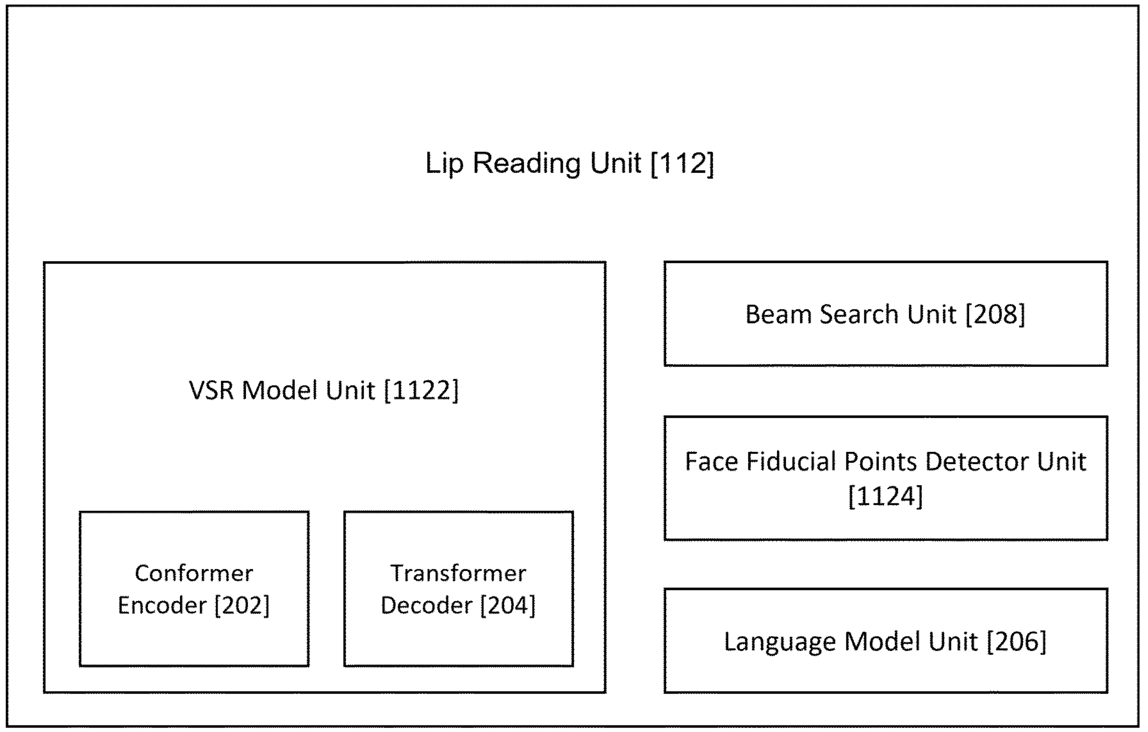
FIG. 2 illustrates an exemplary schematic diagram of a lip reading unit implemented in the system for performing video-based automatic identity verification, in accordance with exemplary embodiments of the present invention.

Referring to FIG. 2, which illustrates an exemplary schematic diagram of the lip reading unit [112] implemented in the system for performing video-based automatic identity verification, in accordance with exemplary embodiments of the present invention. The lip reading unit [112] is configured to detect a correctness of a speech in the video, based on the deepfake detection score, a visual cues match, and a transcription match. The speech is associated with the first user speaking the one or more prompts. The visual cues match comprises one of a valid lip contour movement match and an invalid lip contour movement match.

Also, in an implementation, the valid lip contour movement match and the invalid lip contour movement match is based on the one or more prompts. The valid lip contour movement match is generated in an event: 1) one or more word sequence predictions in the list of most probable word sequence predictions match with one or more word sequences associated with the one or more prompts, 2) a pre-defined threshold number of words of the one or more word sequence predictions match with a pre-defined threshold number of words in the one or more prompts, and 3) the pre-defined threshold number of words of the one or more word sequence predictions are present in a same order as the pre-defined threshold number of words in the one or more prompts.

In another implementation, the lip reading unit [112] is configured to detect the correctness of the speech based on an event where the deepfake detection score of the video is above the deepfake threshold. Further, the lip reading unit [112] comprises a VSR model unit [1122], a face fiducial points detector unit [1124], a language model unit [206], and a beam search unit [208].

In an implementation, the visual cues match is performed based on a reiterative performance of a set of steps until an occurrence of an end-of-sentence token. The set of steps comprises a detection of a set of facial landmarks on the first human object in one or more frames of the video by the facial fiducial point detector unit [1124]. The set of steps further comprises an extraction of one or more regions of interests (ROIs) based on the set of facial landmarks by the facial fiducial point detector unit [1124]. The set of steps further comprises a performance of a visual speech recognition on the ROIs by the visual speech recognition (VSR) model unit [1122]. The VSR model unit [1122] is a neural network based unit comprising the conformer encoder [202] and the transformer decoder [204]. The set of steps further comprises an obtaining of a set of lip features based on the performance of the VSR on the ROIs by the conformer encoder [202]. The set of lip features comprises a corresponding vector for one or more sets of frames corresponding to a phoneme. The set of steps further comprises a prediction of a next most probable phoneme based on the set of lip features by the transformer decoder [204] using a language model unit [206]. The next most probable phoneme is further based on a restricted vocabulary implemented in the language model unit [206], and wherein the restricted vocabulary comprises a pre-defined set of phonemes. Also, in an implementation the next most probable phoneme is further based on a set of previously predicted phonemes. The visual cues match is further performed based on a generation of one or more word sequence predictions based on the set of steps by the transformer decoder. The visual cues match is further performed based on a prediction of a list of most probable word sequence predictions based on the one or more word sequence predictions by a beam search unit [208]. The list comprises a pre-defined number of the most probable word sequence predictions. The visual cues match is further performed based on a mapping of each word in the list of the most probable word sequence predictions to a corresponding nearest word of interest from a pre-defined list of probable words, by the beam search unit [208], using one or more mapping techniques. In an implementation, the one or more mapping techniques comprise of fuzzy match technique, phonetics match technique or a combination thereof. The visual cues match is further performed based on a performance of the visual cues match, by the lip reading unit [112], based on the mapping.

In an implementation, the lip reading unit [112] detects a pre-defined number of facial landmarks in the one or more frames of the video. For example, the lip reading unit [112] may detect 68 facial landmarks in each frame of the video using a facial fiducial point detector unit which may be a deep neural network comprising a series of convolutional layers. The facial fiducial point detector unit may form a part of the lip reading unit [112]. In an implementation, a subset of the detected facial landmarks is used to extract one or more regions of interest (ROIs) on the lip region of the face, i.e., the area around the mouth. In an example, the one or more regions of interest (ROIs) on the face are extracted by utilizing landmarks 49-68. Further, one or more detected ROIs of the face may be passed to a model which performs Visual Speech Recognition (VSR). Further, the model may also predict what the first user is speaking and the prediction may be made by the model based on visual cues.

In an implementation, the VSR model unit [1122] comprises of a conformer encoder [202] and a transformer decoder [204]. The conformer encoder may perform one or more functions of a transformer as well as one or more convolution functions. Pertinently, the VSR model unit [1122] may be a neural network based unit.

In an implementation, the conformer encoder [202] processes the video over time and space using a set of 3-dimensional (3D) convolutional layers and 3D max pooling. The output from the 3D convolution block may be passed iteratively through a number of conformer blocks. In an exemplary implementation, the number of conformer blocks is 12. Finally, a vector of 'N' float values, where 'N' is a natural number, is obtained for each set of frames corresponding to a phoneme. The set of corresponding vector for each set of frames corresponding to a phoneme, may be referred to as lip features.

In an implementation, the transformer decoder [204] takes as an input the previously predicted phoneme (initially, the start-of-sentence token) and one or more lip features to predict the next most probable phoneme using a language model unit [206]. In an implementation, repeated phonemes may be combined using a CTC loss to ensure output consistency. This process may be repeated until the end-of-sentence token is encountered at which point the final predicted output is achieved. The final predicted output is the word sequence being spoken in the video.

In an implementation, a vocabulary of the language model unit [206] is restricted to only a set of phonemes that can possibly occur in one or more prompts provided by the prompt generation unit [108]. Thus, in an instance, where the predictions are made for only a set of pre-defined words, one or more alphabets that can be generated by the language model unit [206] may be known. In that case, the vocabulary of the language model unit [206] is restricted to those alphabets only. For example, in a case where only numbers 1 to 10 are generated for the first user to speak. It is known in this case that these numbers contain, say, 16 particular alphabets only. Thus, the vocabulary of the language model unit [206] is restricted, in this case, to those 16 alphabets only. This increases the accuracy of the system. Further, in another implementation, the possible phoneme outputs of the model at each subsequent step are also restricted based on the previous predicted continuous phoneme sequence (part of word), this can make the word level predictions of the model more accurate and relevant to the use case.

Continuing with the above example, where the only numbers 1 to 10 are generated for the first user to speak. Now, say the number generated for the user is '2', and the first letter prediction made by the language model unit [206] is 'T'. After 'T', the language model unit [206] knows that the next alphabet can be either "w" (for '2') or "h" (for '3') or "e" (for '10'). This will also increase the accuracy of the predictions and reduce time as well.

In an implementation, the beam search unit [208] may be implemented to obtain an additional information. The beam search unit [208] may predict one or more 'M' most probable outputs, where 'M' is a natural number, at each decoding step using a conditional probability of the phonemes occurring together in a sequence. Finally, the 'M' most probable word sequence predictions may be made. Each word or some of the words in the 'M' most probable word sequence predictions is mapped to a nearest word of interest from a list of probable words using the one or more mapping technique such as the fuzzy match technique or phonetics match technique or a combination thereof. In an implementation, the 'M' most probable word sequence predictions are ranked according to their probability of correctness.

In an implementation, the lip reading unit [112] generates a prediction match result. The prediction match result may be a positive result and a negative result. The positive prediction match result suggests that the lip reading prediction made by the lip reading unit [112] matches with the one or more prompts generated by the prompt generation unit [108], while the negative prediction match result suggests that the lip reading prediction made by the lip reading unit [112] do not match with the one or more prompts generated by the prompt generation unit [108]. In an implementation, the positive prediction match result may be generated by the lip reading unit [112] in an event if any of the top 'M' lipreading predictions match with the one or more prompts generated by the prompt generation unit [108]. In an implementation, the prediction matches with the one or more prompts generated by the prompt generation unit [108], in an event all of the below conditions are satisfied:

a. the sequence from the top 'M' lipreading prediction sequences is above a predefined confidence threshold value;
b. at least a pre-defined threshold number of words of the prediction match with the words in the one or more prompts generated by the prompt generation unit [108]; and
c. the matching words in the prediction are present in the same order as the words in the one or more prompts generated by the prompt generation unit [108].

In an event the prediction matches the prompts that the user is asked to speak, the video passes a lip reading check performed by the lip reading unit [112] and a face verification process is initiated. In an implementation, in an event the video does not pass the lip reading check performed by the lip reading unit [112], the identity verification fails.

Furthermore, for performing the transcription match, the system comprises a sentence level embedding matching module. The sentence level embedding matching module configured to: 1) generate one or more first embeddings corresponding to a transcription of the speech, wherein the transcription of the speech is extracted from the speech in the video using a speech to text unit, 2) generate one or more second embeddings corresponding to the one or more prompts, 3) calculate a similarity metric between the one or more first embeddings and the one or more second embeddings, and 4) perform the transcription match based on the similarity metric. For instance, in an implementation, the audio is extracted from the video. In this implementation, the audio is passed to a speech-to-text transcription engine or an automatic speech recognition (ASR) system, that may form a part of the speech-to-text matching unit [114], to obtain a speech-to-text transcription. The speech-to-text transcription may be matched with the one or more prompts generated by the prompt generation unit [108]. For this purpose, in an implementation, the speech-to-text transcription may be passed through a transformer based sentence level embedding matching module to get one or more embeddings corresponding to the speech-to-text transcription. Also, here at this stage, the one or more prompts generated by the prompt generation unit [108] may be passed through a transformer based sentence level embedding matching module to get the one or more embeddings corresponding to the one or more prompts generated by the prompt generation unit [108]. In an implementation, a similarity metric may be used to calculate a similarity between the one or more embeddings corresponding to the speech-to-text transcription and the one or more embeddings corresponding to the one or more prompts generated by the prompt generation unit [108]. In an event the similarity metric is above a predefined similarity threshold, the speech-to-text matching unit [114] may predict that one or more transcription matches with the one or more prompts generated by the prompt generation unit [108]. In another event where the similarity metric is below the predefined similarity threshold, the speech-to-text matching unit [114] may predict that the one more transcription does not match with the one or more prompts generated by the prompt generation unit [108]. In an implementation, where the speech-to-text matching unit [114] predicts that the transcription does not match with the one or more prompts generated by the prompt generation unit [108], the first user may be asked to recapture the video. In an implementation, the first user is asked to recapture the video through a prompt generated and displayed to the first user via the user interface [154].

Further, upon detection of the correctness of the speech in the video, the face detection unit [116] detects in one or more frames of the video the first human object based on the correctness of the speech and in the image of the identification document, the second human object. In an implementation, the face detection unit [116] is configured to detect, in the one or more frames of the video, the first human object and in the image of the identification document, the second human object, based on a neural network-based rotation-invariant model implemented in the face detection unit [116].

Further, in an implementation, the video is first processed to detect the first human object (i.e., face of the first person) by the face detection unit [116] in each frame of the video. In an implementation, the solution encompasses use of one or more techniques such as including but not limited to face bounding box detection technique, face fiducial point detection technique and/or techniques used to crop and align a largest human face detected in the video, etc. for detection of the first human object.

In an implementation, the face in each frame of the video may be detected and cropped using the face detection unit [116]. The face detection unit [116] may implement the neural network-based rotation-invariant model. Further, in an implementation, the neural network-based rotation-invariant model is trained on a comprehensive dataset encompassing a wide range of facial orientations and speech characteristics. The training of the neural network-based rotation-invariant model enables it to accurately and efficiently detect the first human object in the video frames and the second human object in the image of identification document, even when faces are presented at unconventional angles.

In an implementation, a neural network-based rotation-invariant face detector may detect a predefined number of fiducial points on the face present in each frame of the video. For example, the face detection unit [116] may detect five fiducial points, corresponding to, for example, left eye, right eye, nose, left corner of the lips, and right corner of the lips along with a face bounding box. Here, if multiple faces are detected in each frame of the video, a largest face may be chosen based on an area of the face bounding box. Also, in an implementation, the face fiducial points of the largest face are used to align and crop the face in such a way that a line between the left eye and right eye is horizontal and the face is rescaled to a fixed size. Also, in an implementation, the face detection unit [116] processes the video to warp the face such that the fiducial points fall as close as possible to one or more predefined positions of the face. That is, the videos provided by the first user can be rotated at any angle, and of different sizes depending on a distance from the capturing unit [106], which can be addressed by the face detection unit [116]. Further, if no face is detected, the first user may be prompted via the user interface [154] to recapture the video.

Further, in an implementation, the face detection unit [116] also performs detection of the second human object in identification document. The image of the second human object that is captured by the capturing unit [106] is cropped using the face detection unit [116] or the network-based rotation-invariant face detector. In an implementation, the image of the second human object is detected from a cropped and an aligned image. Also, in an implementation, the identification document is firstly detected and cropped from the image captured by the capturing unit [106] by using the convolutional neural network-based object detector. In an implementation, the detected and cropped image of identification document is passed through a card aligner which uses a text detector to detect one or more text fields present on the identification document and rotate the detected and cropped image such that the one or more text fields are horizontal. Thereafter, the five fiducial points on a face present in the image corresponding to the left eye, right eye, nose, left corner of the lips, and right corner of the lips along with the face bounding box are detected. Also, in an event if more than one face is detected in the image of identification document, a largest face is chosen based on an area of the face bounding box. Also, in an implementation, the face fiducial points of the largest face are used to align and crop the face present in the identification document in such a way that a line between left eye and right eye is horizontal and the face is rescaled to a fixed size. Furthermore, in an event if no face is detected in the image captured by the capturing unit [106], the first user is prompted by the processing unit [102] to recapture the image of the identification document.

Upon face detection, the face verification unit [120] is configured to generate a first similarity score, and a second similarity score, based on the detection of the first human object and the second human object by the face detection unit [116]. The first similarity score is generated based on a similarity within a plurality of feature vectors of the first human object present in a plurality of frames of the video. The second similarity score is generated based on a similarity between the plurality of feature vectors of the first human object present in the plurality of frames of the video and a feature vector of the second human object present in the image of the identification document. The face verification unit [120] is further configured to automatically perform the identity verification of the first user, based on the first similarity score, and the second similarity score.

Also in an implementation, wherein for automatically performing the identity verification of the first user, the face verification unit [120] is further configured to perform a first comparison of the first similarity score with a pre-defined first threshold. The face verification unit [120] is further configured to perform a second comparison of the second similarity score with a pre-defined second threshold. The face verification unit [120] is further configured to generate one of a successful identity verification prompt and an unsuccessful identity verification prompt based on the first comparison and the second comparison. The successful identity verification prompt is generated in an event the first similarity score is higher than the pre-defined first threshold, and the second similarity score is higher than the pre-defined second threshold, and the unsuccessful identity verification prompt is generated in an event at least one of the first similarity score is lower than the pre-defined first threshold, and the second similarity score is lower than the pre-defined second threshold. The face verification unit [120] is further configured to automatically perform the identity verification of the first user based on one of the successful identity verification prompt and the unsuccessful identity verification prompt.

Further, the system [100] comprises a liveness checking unit [118], wherein prior to the face verification unit [120] automatically performing the identity verification of the first user, the liveness checking unit [118] is configured to check a liveness of at least one of the first human object in the plurality of frames of the video and the identification document comprising the second human object. For instance, in an implementation, the liveness checking unit [118] performs a face liveness check from the face crop from each frame of the video or from a number of randomly sampled frames of the video, to check liveness of the first human object. For this purpose, the video may be passed through a selfie liveness detection module which consists of a cascade of convolutional layers or transformer layers. If one or more frames are detected as non-live, the video may be rejected and the first user may be asked, via the user interface [154] to recapture the video. Also, in an implementation, the selfie liveness detection module is a part of the liveness checking unit [118]. Also, the ROI of the identification document may be passed through an identification document liveness detection module, which may form part of the liveness checking unit [118], and which may consist of a cascade of convolutional layers or transformer layers. If the ROI of the identification document is detected as non-live, the identification card may be rejected and the first user may be asked, via the user interface [154] to recapture the identification document.

In an implementation, the face verification unit [120] is provided with one or more cropped and aligned images from each frame of the video or the one or more cropped and aligned images from a number of randomly sampled frames of the video are passed through the face verification unit [120]. In an implementation, the face verification unit [120] comprises a face feature extractor convolutional network. Further, for performing a task of face feature extraction, an RGB (red, green blue) image (that is, a truecolor image) of the first human object is first normalized and fed into an input layer of the face feature extractor convolutional network and an output of the input layer is successively fed through a plurality of deep convolutional layers. The image of the first human object reduces in dimension in each step till finally, a single vector of 256 float values (i.e., the image face feature vector) is obtained. The vector (i.e., the image face feature vector) holds a compact representation of the input image of the first human object which can be compared with other one or more vectors later in a pipeline of the system [100]. Also, in an implementation, the cropped and aligned images having the face of first user is passed through the face feature extractor convolutional network. The RGB image may first be normalized and fed into the input layer of the face feature extractor convolutional network. The output of input layer may be successively fed through the deep convolutional layers. The image reduces in dimension in each step till finally, a single vector of 256 float values is obtained. The vector may hold a compact representation of the input face image which can be compared with other vectors as and when required.

Further, in an implementation, each feature vector extracted from all the frames of the video or the feature vectors extracted from a number of randomly sampled frames of the video is matched with other feature vectors extracted from all the frames of the video or the feature vectors extracted from a number of randomly sampled frames of the video. The matching is performed to verify that whether the first user is the same person who is present throughout the video.

Further, in an implementation, the feature vectors extracted from all the frames of the video or the feature vectors extracted from a number of randomly sampled frames of the video are matched with one on more features vectors of the face present in the identification document. The matching is performed to verify whether the second user present in the identification document is same person who is recording the video. The feature vectors are compared using a similarity metric/similarity score. In an event this similarity score is higher than or equal to a predefined threshold, the video-based automatic identity verification is successful. In an event the similarity score is lower than a predefined threshold, the video-based automatic identity verification is unsuccessful.

Figure 3:
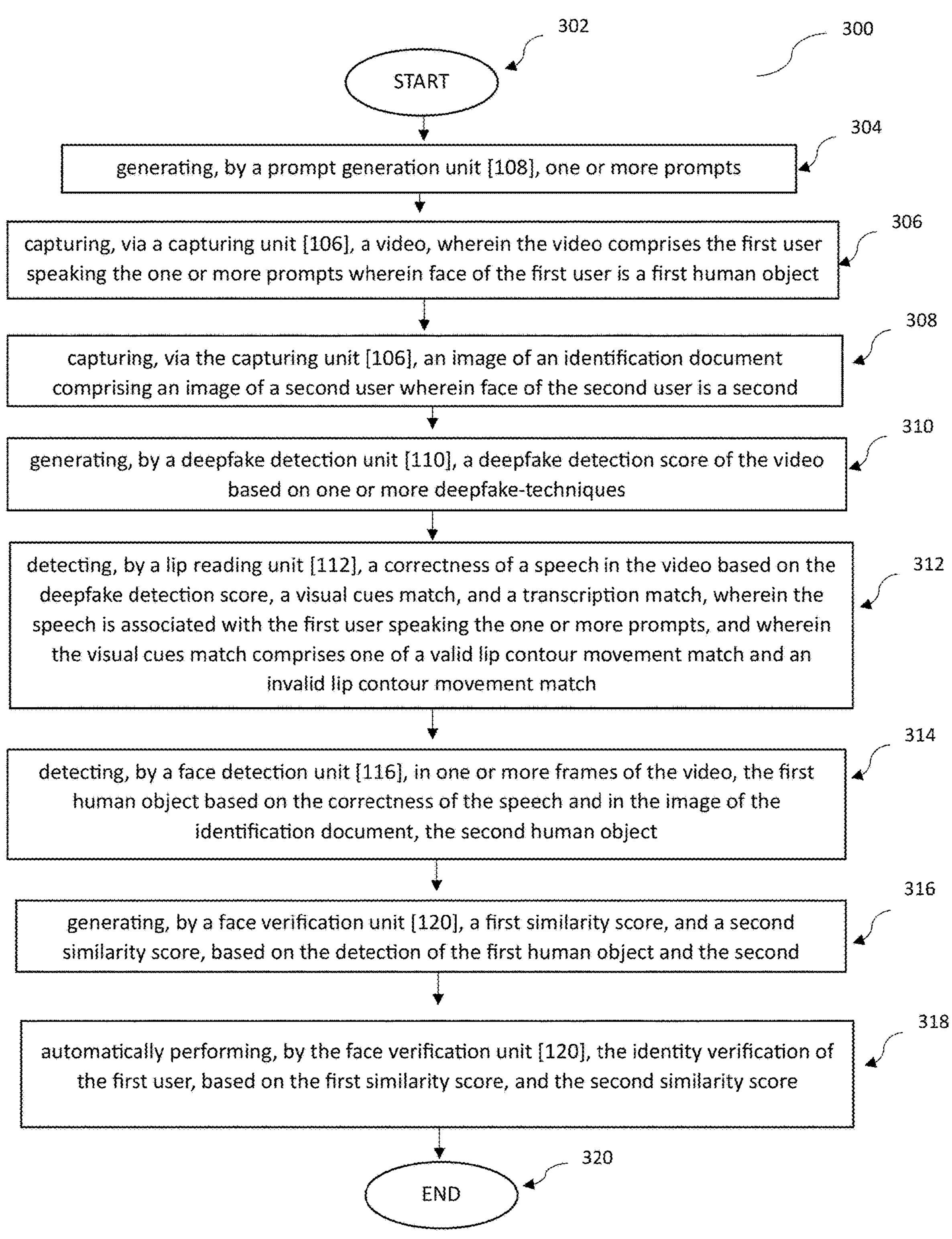
FIG. 3 illustrates an exemplary method flow diagram for performing video-based automatic identity verification, in accordance with exemplary embodiments of the present invention.

Referring now to FIG. 3, an exemplary method [300] for performing video-based automatic identity verification, in accordance with exemplary embodiments of the present invention is shown. In an implementation, the method [300] is performed by the system [100]. As shown in FIG. 3, the method [300] begins at step [302]. In an implementation the method [300] may begin upon receiving a request for authentication of an application for identity verification. In an event the method [300] may be implemented at a user device [150](depicted in FIG. 1), and an authentication request may be received at the method [300] from an application such as a banking application, etc. In another event the method [300] may be implemented in a kiosk, and an authentication request may be received at the system [300] from a user via a user interface of the kiosk.

Next, at step [304], the method [300] comprises generating, by a prompt generation unit [108], one or more prompts. The one or more prompts are displayed to the user via a user interface [154]. In an implementation, as used herein "a prompt" may be a randomly generated unique sequence of 'N' number of digits or a custom statement in a context of what the verification process is for, or a random statement generated by the system [100], or a standard statement, or any combination thereof.

Next at step [306], the method [300] comprises capturing, via a capturing unit [106], a video, wherein the video comprises the first user speaking the one or more prompts wherein face of the first user is a first human object. For example, the capturing unit [106] records the video of the first user speaking the one or more prompts generated by the prompt generation unit [108].

Next at step [308], the method [300] comprises capturing, via the capturing unit [106], an image of an identification document comprising an image of a second user wherein face of the second user is a second human object. For example, the second user presents the identification document such as Personal Account Number (PAN) card, driver license to the capturing unit [106] and the capturing unit [106] captures the image of the identification document.

In an instance, the human face present in the video is referred to as a first human object and/or the human face present in the identification document shown by the first user in the video is referred to as a second human object. Moreover, in an implementation, the first user is a human object and the second user is an image of the human object present in the identification document. For example, the first user is the person who is applying for a loan and second user is the image of person present in a permanent account number (PAN) card or driver license. Further, the system [100] aims to verify whether the image in the identification document is of the same person who is present in the video. For another example, the first user is interacting with the system [100] by speaking the one or more prompts provided by the prompt generation unit [108] such as "a randomly generated unique sequence of N digit".

Also, in an implementation, the video (for example a selfie video) is captured by the capturing unit [106] such that the captured video includes both the first human object and the identification document. However, the present disclosure is not limited thereto and in one other implementation, the capturing unit [106] may capture images and/or video separately for capturing the first human object and the identification document. In an implementation, a medium of information capture can be a messenger-based chatbot that gives instructions for capturing the video and the identification document along with the prompts that the first user needs to speak. Or the medium of information capture can be a mobile or web app which has the ability to capture the identification document and video and can give instructions and the one or more prompts the first user needs to speak one by one or all at a time.

Next at step [310], the method [300] comprises generating, by a deepfake detection unit, a deepfake detection score of the video based on one or more deepfake-techniques.

In an implementation, the passing of the captured video through the deepfake detection unit [110] prior to the lip reading unit [112] also affirms one or more results of the lip reading unit [112]. Thus, in an instance, where the user might try to bypass a test of lip-reading by morphing a video for lip-reading unit [112] detection test, the same will be caught by the deepfake detection unit [110].

In an implementation, the deepfake detection score represents a probability that the video has been or has not been tampered with. Based on a comparison of the deepfake detection score with a preset deepfake threshold for the deepfake detection score, the video is classified as either being a deepfake or a genuine video. Furthermore, in an implementation, if the deepfake detection score indicates that the video has been tampered, the deepfake detection unit [110] specifies a suspicious entry or an impersonation attempt or the first user is prompted by the deepfake detection unit [110] to recapture the video.

For example, the deepfake detection score for the video is within a range of 10 to 20, signifying a high likelihood of authenticity. The preset deepfake threshold is 30 to maintain a balance between one or more false positives and one or more false negatives. In this scenario, since the deepfake detection score is below the preset deepfake threshold, the video is deemed authentic, and proceeds further without intervention. However, in an instance where the deepfake detection score is above the deepfake threshold, for example, 70, the deepfake detection unit [110] prompts the first user to recapture the video, signaling a potential concern with the authenticity.

Further, in an implementation, if the deepfake detection score indicates that the video has not been tampered, a frames per second (FPS) of the video is set to 25 and the next step [312] is implemented.

In an implementation, wherein the detecting, by the lip reading unit [112], the correctness of the speech is further based on an event where the deepfake detection score of the video is above the deepfake threshold.

Next at the step [312], the method [300] comprises detecting, by a lip-reading unit [112], a correctness of a speech in the video based on the deepfake detection score, a visual cues match, and a transcription match, wherein the speech is associated with the first user speaking the one or more prompts, and wherein the visual cues match comprises one of a valid lip contour movement match and an invalid lip contour movement match.

Further, in an implementation, the method [300] comprises detecting, by the lip reading unit [112], the correctness of the speech of the user based on visual cues. The visual cues can be lip contour movements. Here, the speech of the user, that is, the content what the first user speaks is matched with a content of the one or more prompts generated by the prompt generation unit [108].

In an implementation, the visual cues match is performed based on a reiterative performance of a set of steps until an occurrence of an end-of-sentence token. The set of steps comprises a detection of a set of facial landmarks on the first human object in the one or more frames of the video by a facial fiducial point detector unit [1124]. The set of steps further comprises an extraction of one or more regions of interest (ROIs) based on the set of facial landmarks by the facial fiducial point detector unit [1124]. The set of steps further comprises a performance of a visual speech recognition on the ROIs by a visual speech recognition (VSR) model unit [1122]. The VSR model unit [1122] is a neural network based unit comprising a conformer encoder [202] and the transformer decoder [204]. The set of steps further comprises an obtaining of a set of lip features based on the performance of the VSR on the ROIs by the conformer encoder [202], wherein the set of lip features comprises a corresponding vector for one or more sets of frames corresponding to a phoneme. The set of steps further comprises a prediction of a next most probable phoneme based on the set of lip features by the transformer decoder [204] using a language model unit [206]. The visual cues match is further performed based on a generation of one or more word sequence predictions based on the set of steps by the transformer decoder. The visual cues match is further performed based on a prediction of a list of most probable word sequence predictions based on the one or more word sequence predictions by a beam search unit [208], wherein the list comprises a pre-defined number of the most probable word sequence predictions. The visual cues match is further performed based on a mapping of each word in the list of the most probable word sequence predictions to a corresponding nearest word of interest from a pre-defined list of probable words, by the beam search unit [208], using one or more mapping techniques. In an implementation, the one or more mapping techniques comprises a fuzzy match technique, a phonetics match technique or a combination thereof. The visual cues match is further performed based on a performance of the visual cues match, by the lip reading unit [112], based on the mapping.

In an implementation, the valid lip contour movement match and the invalid lip contour movement match is based on the one or more prompts. The valid lip contour movement match is generated in an event, one or more word sequence predictions in the list of most probable word sequence predictions match with one or more word sequences associated with the one or more prompts, further the valid lip contour movement match is generated in an event, where a pre-defined threshold number of words of the one or more word sequence predictions match with a pre-defined threshold number of words in the one or more prompts. Further the valid lip contour movement match is generated in an event, where the pre-defined threshold number of words of the one or more word sequence predictions are present in a same order as the pre-defined threshold number of words in the one or more prompts.

In an implementation, the next most probable phoneme is further based on a restricted vocabulary implemented in the language model unit [206], and wherein the restricted vocabulary comprises a pre-defined set of phonemes.

In an implementation, the next most probable phoneme is further based on a set of previously predicted phonemes.

In an implementation, the transcription match is performed based on: 1) generating, by a sentence level embedding matching module, one or more first embeddings corresponding to a transcription of the speech, wherein the transcription of the speech is extracted from the speech in the video using a speech to text unit, 2) generating, by the sentence level embedding matching module, one or more second embeddings corresponding to the one or more prompts, 3) calculating, by the sentence level embedding matching module, a similarity metric between the one or more first embeddings and the one or more second embeddings, and 4) performing, by the sentence level embedding matching module, the transcription match based on the similarity metric.

Next at step [314], the method [300] comprises detecting, by a face detection unit [116], in one or more frames of the video, the first human object based on the correctness of the speech and in the image of the identification document, the second human object. In an implementation, the face in each frame of the video may be detected and cropped using the face detection unit [116]. The method [300] also encompasses performing, by the face detection unit [116], detection of the second human object in the identification document.

Further, in an implementation, wherein prior to automatically performing, by the face verification unit [120], the identity verification of the first user, the method comprises checking, by a liveness checking unit [118], a liveness of at least one of the first human object in the plurality of frames of the video and the identification document comprising the second human object. Furthermore, in an implementation, the method encompasses performing, by the liveness checking unit [118], the face liveness check from a face crop from each frame of the video or from a number of randomly sampled frames of the video, to check liveness of the first human object.

Next at step [316], the method [300] comprises generating, by a face verification unit [120], a first similarity score, and a second similarity score, based on the detection of the first human object and the second human object. The first similarity score is generated based on a similarity within a plurality of feature vectors of the first human object present in a plurality of frames of the video. The second similarity score is generated based on a similarity between the plurality of feature vectors of the first human object present in the plurality of frames of the video and a feature vector of the second human object present in the image of the identification document.

Further, in an implementation, the method [300] encompasses matching each feature vector extracted from all the frames of the video or the feature vectors extracted from a number of randomly sampled frames of the video, with other feature vectors extracted from all the frames of the video or the feature vectors extracted from a number of randomly sampled frames of the video. The matching is performed to verify whether the same person is present throughout the video.

Further, in an implementation, the method encompasses matching the feature vectors extracted from all the frames of the video or the feature vectors extracted from a number of randomly sampled frames of the video, with one or more feature vectors of the face present in the identification document. This matching is performed to verify whether the person present on the identification document is recording the video. The method also encompasses comparing the feature vectors of the face present in the identification document using a similarity metric/similarity score. In an event this similarity score is higher than or equal to a predefined threshold, a verification of the faces present in the video and the identification document is successful. In an event where the similarity score is lower than a predefined threshold, the verification of faces present in the video and the identification document is unsuccessful.

Next at step [318], the method [300] comprises automatically performing, by the face verification unit, the identity verification of the first user, based on the first similarity score, and the second similarity score.

In an implementation, the automatically performing, by the face verification unit [120], the identity verification of the first user, further comprises performing, by the face verification unit [120], a first comparison of the first similarity score with a pre-defined first threshold. The identity verification of the first user further comprises performing, by the face verification unit [120], a second comparison of the second similarity score with a pre-defined second threshold. The identity verification of the first user further comprises generating, by the face verification unit [120], one of a successful identity verification prompt and an unsuccessful identity verification prompt based on the first comparison and the second comparison. The successful identity verification prompt is generated in an event the first similarity score is higher than the pre-defined first threshold, and the second similarity score is higher than the pre-defined second threshold, and the unsuccessful identity verification prompt is generated in an event at least one of the first similarity score is lower than the pre-defined first threshold, and the second similarity score is lower than the pre-defined second threshold. The identity verification of the first user further comprises automatically performing, by the face verification unit [120], the identity verification of the first user based on one of the successful identity verification prompt and the unsuccessful identity verification prompt.

In an implementation, wherein the detecting, by the face detection unit [116], in one or more frames of the video, the first human object and in the image of the identification document, the second human object, is further based on a neural network-based rotation-invariant model implemented in the face detection unit [116].

Further, the method [300] terminates at step [320].

The technical solutions in this disclosure propose novel techniques for performing video-based automatic identity verification. The technical solutions of the present disclosure also provides a technical advancement over the currently known solutions at least by: 1) providing an identity verification by determining an authentication of a person in a video, based at least on a lip reading check, 2) determining the authentication of a person in a video, based at least on performing a liveness check of a person and/or an image of the identification document. Also, the present solution is technically advanced over the currently known solutions as in the present solution along with the liveness check other checks such as including but not limited to deepfake check, lip-reading check, face feature vectors match of person in the video as well as the face image in the identification document, etc. are also performed for authentication of the person in the video. Also, the technical solution of the present disclosure has the use cases in at least the following:

1. Identity verification for Sim Card issuance for telecom companies,
2. Identity verification for contactless and remote loan issuance,
3. Identity verification for issuance of life certificates for pensioners remotely,
4. Identity verification for issuance of life or health insurance,
5. Identity verification during virtual video verification for customer onboarding to a multitude of financial services,
6. Identity verification for customer onboarding for a trading account,
7. Identity verification for opening a bank account.

Further for identity verification for sim card issuance for telecom companies, the telecom companies may use the present solution to verify an identity of individuals applying for a new SIM card. A user may record a video saying a predefined prompt, and the system verifies the identity based on one or more facial features, speech correctness, and deepfake detection.

Further for identity verification for contactless and remote loan issuance, a financial institution employs the present solution to ensure that the person applying for a loan is authentic. The present solution verifies the identity of the user through video, minimizing the need for in-person verification.

Further for identity verification for issuance of life certificates for pensioners remotely. A pensioner can remotely prove his identity for a life certificate issuance. The present solution verifies an identity of the pensioner through a video recording, enhancing convenience for pensioners who may find it challenging to visit a physical location.

Further for identity verification for issuance of life or health insurance, insurance companies may leverage the present solution to verify the identity of individuals applying for life or health insurance. This ensures that the person in the video matches the identity on their submitted documents, reducing the risk of fraudulent claims. For example, an applicant is required to record a video, articulating a specific phrase, and the present solution meticulously verifies the applicant's identity. The present invention guarantees that the person in the video aligns with the identity presented in their submitted documents, significantly lowering the risk of fraudulent claims. By integrating the present solution, insurance companies enhance the security of an application process, fostering trust and reducing the potential for an identity-related insurance fraud.

Further for identity verification during virtual video verification for customer onboarding to a multitude of financial services. The financial service provider may use the present solution for virtual customer onboarding, where the customer can open one or more accounts or access various financial services remotely. The identity verification process enhances security and compliance with regulatory requirements.

Further for identity verification for customer onboarding for a trading account, a brokerage firm may use the present solution to verify the identity of one or more customers through a video. This helps prevent identity theft and ensures that the person opening the account is the legitimate account holder.

Further for identity verification for opening a bank account, the banks may implement the present solution to streamline the process of opening a new account, wherein customers record a video saying the required prompts, and the present solution verifies their identity, enhancing the security of the account opening process.

Moreover, in all these instances, the use of method and system for performing video-based automatic identity verification adds an extra layer of security, reduces the chances of identity fraud, and enables remote access to various services, contributing to a more convenient and secure user experience.

While the invention has been explained with respect to many examples, it will be appreciated by those skilled in the art that the invention is not restricted by these examples and many changes can be made to the embodiments disclosed herein without departing from the principles and scope of the present invention.

We claim:

1. A method for performing video-based automatic identity verification of a first user, the method comprising:

generating one or more prompts;

capturing, a video, wherein the video comprises the first user speaking the one or more prompts wherein face of the first user is a first human object;

capturing, an image of an identification document comprising an image of a second user wherein face of the second user is a second human object;

generating, a deepfake detection score of the video based on one or more deepfake-techniques;

detecting, a correctness of a speech in the video based on the deepfake detection score, a visual cues match, and a transcription match, wherein the speech is associated with the first user speaking the one or more prompts, and wherein the visual cues match comprises one of a valid lip contour movement match and an invalid lip contour movement match;

detecting, in one or more frames of the video, the first human object based on the correctness of the speech and in the image of the identification document, the second human object;

generating, a first similarity score, and a second similarity score, based on the detection of the first human object and the second human object, wherein the first similarity score is generated based on a similarity within a plurality of feature vectors of the first human object present in a plurality of frames of the video, and the second similarity score is generated based on a similarity between the plurality of feature vectors of the first human object present in the plurality of frames of the video and a feature vector of the second human object present in the image of the identification document; and automatically performing, the identity verification of the first user, based on the first similarity score, and the second similarity score, wherein the visual cues match is performed based on:

performing re-iteratively, a set of steps until an occurrence of an end-of-sentence token, wherein the set of steps comprises:

detecting, by a facial fiducial point detector unit, a set of facial landmarks on the first human object in the one or more frames of the video;

extracting, by the facial fiducial point detector unit, one or more regions of interest (ROIs) based on the set of facial landmarks;

performing, by a visual speech recognition (VSR) model unit, a visual speech recognition on the ROIs, wherein the VSR model unit is a neural network based unit comprising a conformer encoder and the transformer decoder;

obtaining, by the conformer encoder, a set of lip features based on the performance of the VSR on the ROIs, wherein the set of lip features comprises a corresponding vector for one or more sets of frames corresponding to a phoneme; and predicting, by the transformer decoder using a language model unit, a next most probable phoneme based on the set of lip features;

generating, by the transformer decoder, one or more word sequence predictions based on the set of steps;

predicting, by a beam search unit, a list of most probable word sequence predictions based on the one or more word sequence predictions, wherein the list comprises a pre-defined number of the most probable word sequence predictions;

mapping, by the beam search unit, each word in the list of the most probable word sequence predictions to a corresponding nearest word of interest from a pre-defined list of probable words using one or more mapping techniques; and performing the visual cues match based on the mapping.

2. The method as claimed in claim 1, wherein the valid lip contour movement match and the invalid lip contour movement match is based on the one or more prompts.

3. The method as claimed in claim 2, wherein the next most probable phoneme is further based on a restricted vocabulary implemented in the language model unit, and wherein the restricted vocabulary comprises a pre-defined set of phonemes.

4. The method as claimed in claim 2, wherein the next most probable phoneme is further based on a set of previously predicted phonemes.

5. The method as claimed in claim 1, wherein the valid lip contour movement match is generated in an event:

one or more word sequence predictions in the list of most probable word sequence predictions match with one or more word sequences associated with the one or more prompts;

a pre-defined threshold number of words of the one or more word sequence predictions match with a pre-defined threshold number of words in the one or more prompts; and the pre-defined threshold number of words of the one or more word sequence predictions are present in a same order as the pre-defined threshold number of words in the one or more prompts.

6. The method as claimed in claim 1, wherein the transcription match is performed based on:

generating, by a sentence level embedding matching module, one or more first embeddings corresponding to a transcription of the speech, wherein the transcription of the speech is extracted from the speech in the video using a speech to text unit;

generating, by the sentence level embedding matching module, one or more second embeddings corresponding to the one or more prompts;

calculating, by the sentence level embedding matching module, a similarity metric between the one or more first embeddings and the one or more second embeddings; and performing, by the sentence level embedding matching module, the transcription match based on the similarity metric.

7. The method as claimed in claim 1, wherein the automatically performing, by the face verification unit, the identity verification of the first user, further comprises:

performing, a first comparison of the first similarity score with a pre-defined first threshold;

performing, a second comparison of the second similarity score with a pre-defined second threshold;

generating, one of a successful identity verification prompt and an unsuccessful identity verification prompt based on the first comparison and the second comparison, wherein the successful identity verification prompt is generated in an event the first similarity score is higher than the pre-defined first threshold, and the second similarity score is higher than the pre-defined second threshold, and the unsuccessful identity verification prompt is generated in an event at least one of:

the first similarity score is lower than the pre-defined first threshold, and the second similarity score is lower than the pre-defined second threshold; and automatically performing, the identity verification of the first user based on one of the successful identity verification prompt and the unsuccessful identity verification prompt.

8. The method as claimed in claim 1, wherein prior to automatically performing, the identity verification of the first user, the method comprises checking, by a liveness checking unit, a liveness of at least one of the first human object in the plurality of frames of the video and the identification document comprising the second human object.

9. The method as claimed in claim 1, wherein the detecting, the correctness of the speech is further based on:

an event where the deepfake detection score of the video is above a deepfake threshold.

10. The method as claimed in claim 1, wherein the detecting, in one or more frames of the video, the first human object and in the image of the identification document, the second human object, is further based on a neural network-based rotation-invariant model implemented in the face detection unit.

11. The method as claimed in claim 1, wherein the one or more mapping techniques comprises a fuzzy match technique, a phonetics match technique or a combination thereof.

12. A system for performing video-based automatic identity verification of a first user, the system comprising a processor, wherein the processor is configured to:

generate one or more prompts;

capture a video, wherein the video comprises the first user speaking the one or more prompts wherein face of the first user is a first human object;

capture an image of an identification document comprising an image of a second user wherein face of the second user is a second human object;

generate a deepfake detection score of the video based on one or more deepfake-techniques;

detect a correctness of a speech in the video based on the deepfake detection score, a visual cues match, and a transcription match, wherein the speech is associated with the first user speaking the one or more prompts, and wherein the visual cues match comprises one of a valid lip contour movement match and an invalid lip contour movement match;

detect in one or more frames of the video, the first human object based on the correctness of the speech and in the image of the identification document, the second human object;

generate a first similarity score, and a second similarity score, based on the detection of the first human object and the second human object, wherein the first similarity score is generated based on a similarity within a plurality of feature vectors of the first human object present in a plurality of frames of the video, and the second similarity score is generated based on a similarity between the plurality of feature vectors of the first human object present in the plurality of frames of the video and a feature vector of the second human object present in the image of the identification document; and automatically perform the identity verification of the first user, based on the first similarity score, and the second similarity score, wherein the visual cues match is performed based on:

a reiterative performance of a set of steps until an occurrence of an end-of-sentence token, wherein the set of steps comprises:

a detection of a set of facial landmarks on the first human object in the one or more frames of the video by a facial fiducial point detector unit;

an extraction of one or more regions of interest (ROIs) based on the set of facial landmarks by the facial fiducial point detector unit:

a performance of a visual speech recognition on the ROIs by a visual speech recognition (VSR) model unit, wherein the VSR model unit is a neural network based unit comprising a conformer encoder and the transformer decoder:

an obtaining of a set of lip features based on the performance of the VSR on the ROIs by the conformer encoder, wherein the set of lip features comprises a corresponding vector for one or more sets of frames corresponding to a phoneme; and a prediction of a next most probable phoneme based on the set of lip features by the transformer decoder using a language model unit:

a generation of one or more word sequence predictions based on the set of steps by the transformer decoder:

a prediction of a list of most probable word sequence predictions based on the one or more word sequence predictions by a beam search unit, wherein the list comprises a pre-defined number of the most probable word sequence predictions;

a mapping of each word in the list of the most probable word sequence predictions to a corresponding nearest word of interest from a pre-defined list of probable words, by the beam search unit using one or more mapping techniques; and a performance of the visual cues match based on the mapping.

13. The system as claimed in claim 12, wherein the one or more mapping techniques comprises a fuzzy match technique, a phonetics match technique or a combination thereof.

14. The system as claimed in claim 13, wherein the next most probable phoneme is further based on a restricted vocabulary implemented in the language model unit, and wherein the restricted vocabulary comprises a pre-defined set of phonemes.

15. The system as claimed in claim 13, wherein the next most probable phoneme is further based on a set of previously predicted phonemes.

16. The system as claimed in claim 12, wherein the valid lip contour movement match and the invalid lip contour movement match is based on the one or more prompts.

17. The system as claimed in claim 12, wherein the valid lip contour movement match is generated in an event:

one or more word sequence predictions in the list of most probable word sequence predictions match with one or more word sequences associated with the one or more prompts;

a pre-defined threshold number of words of the one or more word sequence predictions match with a pre-defined threshold number of words in the one or more prompts; and the pre-defined threshold number of words of the one or more word sequence predictions are present in a same order as the pre-defined threshold number of words in the one or more prompts.

18. The system as claimed in claim 12, wherein for performing the transcription match, the system comprises a sentence level embedding matching module, the sentence level embedding matching module configured to:

generate one or more first embeddings corresponding to a transcription of the speech, wherein the transcription of the speech is extracted from the speech in the video using a speech to text unit;

generate one or more second embeddings corresponding to the one or more prompts;

calculate a similarity metric between the one or more first embeddings and the one or more second embeddings; and perform the transcription match based on the similarity metric.

19. The system as claimed in claim 12, wherein for automatically performing the identity verification of the first user, the processor is further configured to:

perform a first comparison of the first similarity score with a pre-defined first threshold;

perform a second comparison of the second similarity score with a pre-defined second threshold;

generate one of a successful identity verification prompt and an unsuccessful identity verification prompt based on the first comparison and the second comparison, wherein the successful identity verification prompt is generated in an event the first similarity score is higher than the pre-defined first threshold, and the second similarity score is higher than the pre-defined second threshold, and the unsuccessful identity verification prompt is generated in an event at least one of:

the first similarity score is lower than the pre-defined first threshold, and the second similarity score is lower than the pre-defined second threshold; and automatically perform the identity verification of the first user based on one of the successful identity verification prompt and the unsuccessful identity verification prompt.

20. The system as claimed in claim 12, the system further comprises a liveness checking unit, wherein prior to the face verification unit automatically performing the identity verification of the first user, the liveness checking unit is configured to check a liveness of at least one of the first human object in the plurality of frames of the video and the identification document comprising the second human object.

21. The system as claimed in claim 20, wherein the processor is configured to detect the correctness of the speech based further on:

an event where the deepfake detection score of the video is above a deepfake threshold.

22. The system as claimed in claim 12, wherein the processor is configured to detect, in the one or more frames of the video, the first human object and in the image of the identification document, the second human object, based further on a neural network-based rotation-invariant model implemented in the face detection unit.

* * * * *